Feb. 25, 1936.  W. MAXWELL  2,032,293
TRACTOR WHEEL
Filed Jan. 19, 1934   4 Sheets-Sheet 1
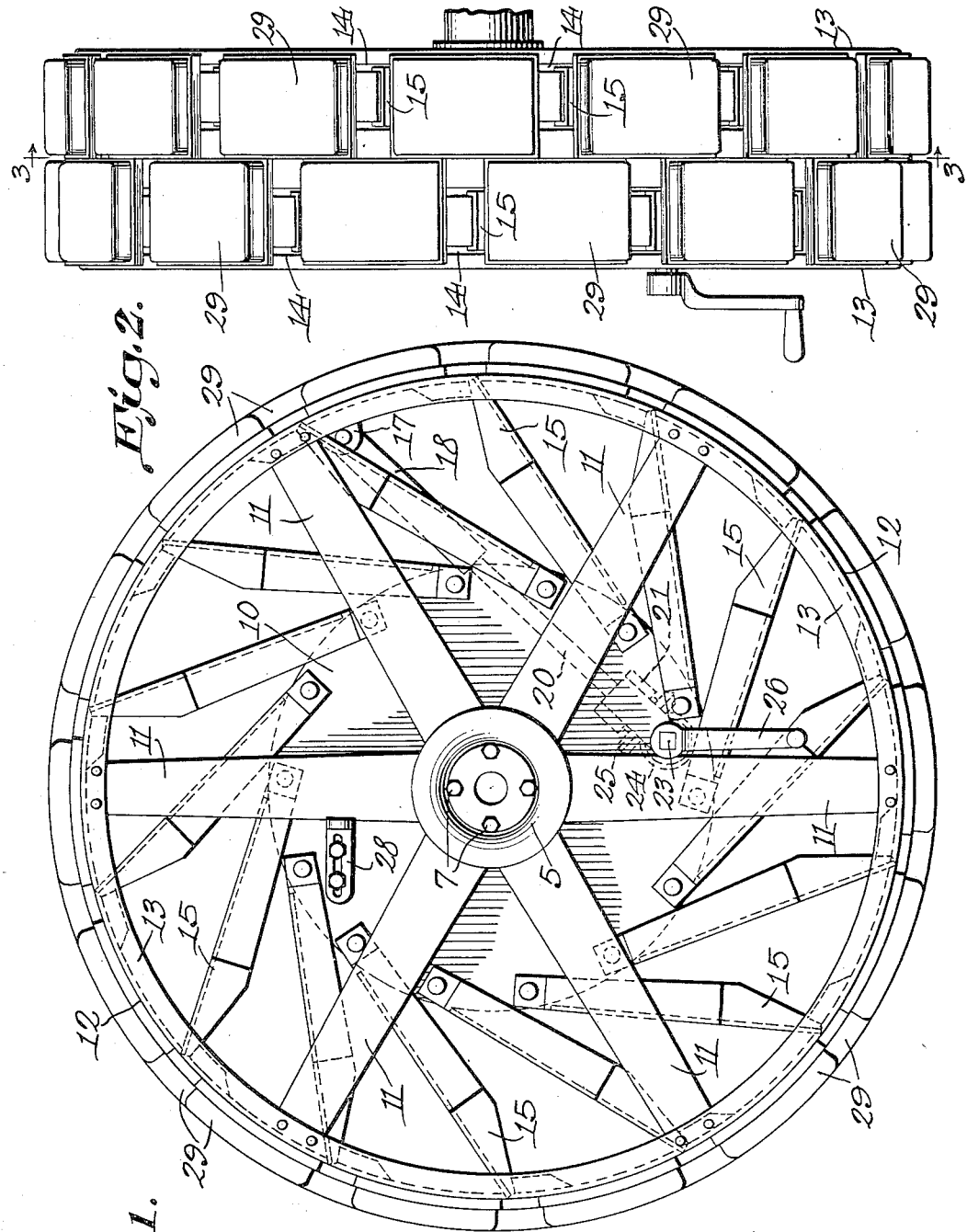

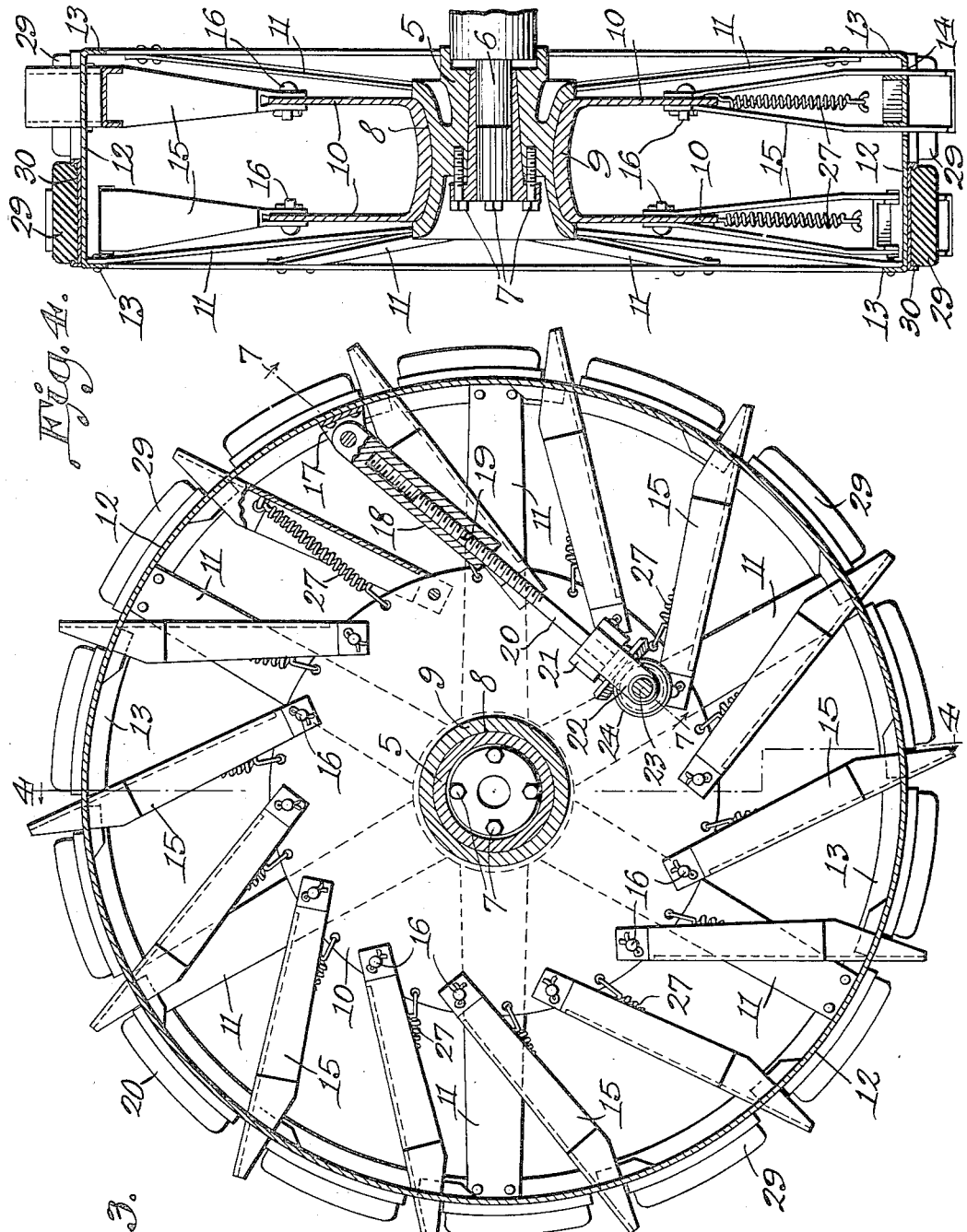

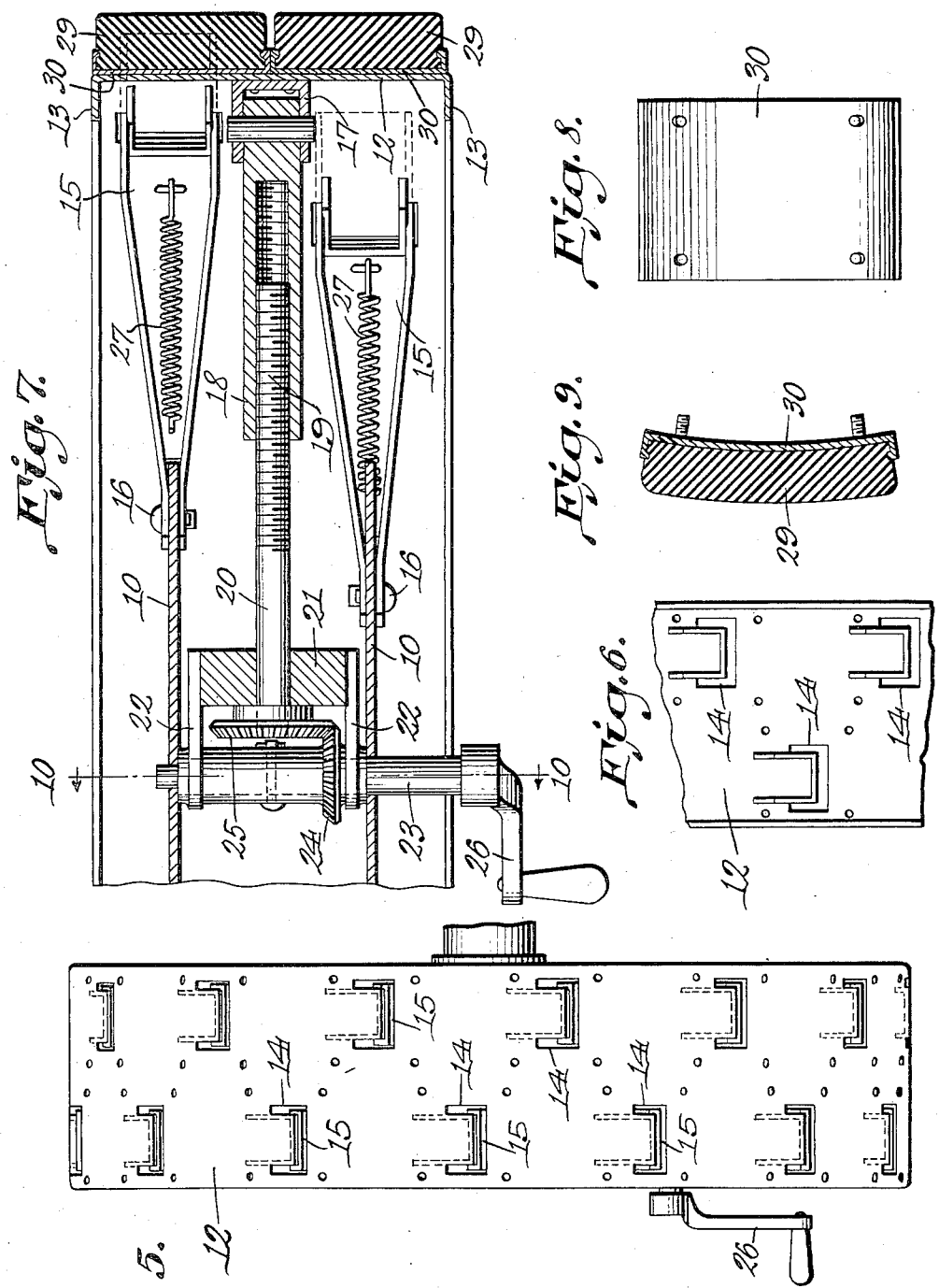

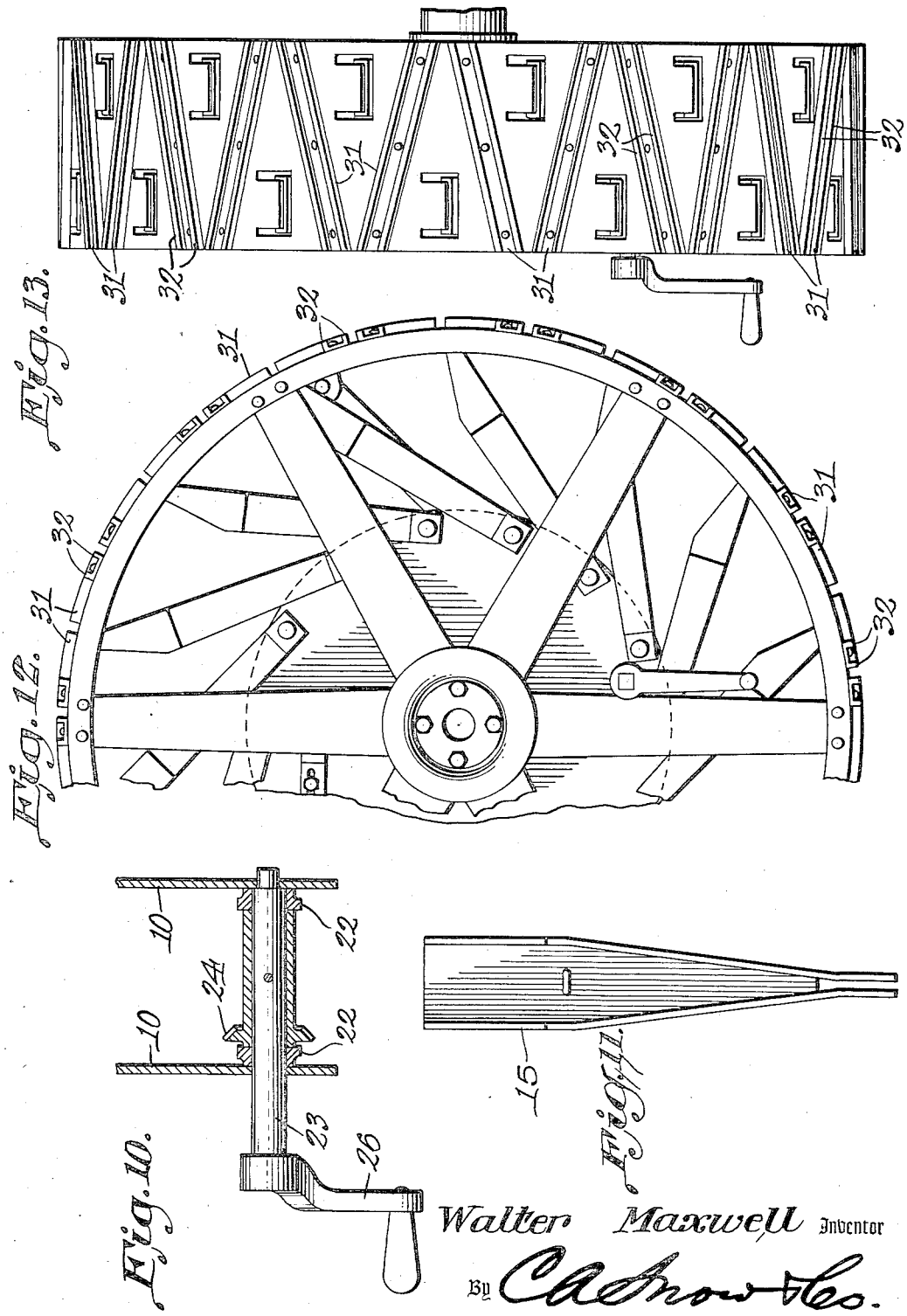

Patented Feb. 25, 1936

2,032,293

UNITED STATES PATENT OFFICE 2,032,293

TRACTOR WHEEL

Walter Maxwell, Marshfield, Wis.

Application January 19, 1934, Serial No. 707,402

1 Claim. (Cl. 301—46)

This invention relates to tractor wheels, the primary object of the invention being to provide tractor wheels so constructed that a tractor supplied with the wheels forming the subject matter of this invention, may be operated on concrete or other smooth road surfaces without damage to the road surface.

An important object of the invention is the provision of means carried by the wheels of a tractor for gripping the road surface over which the tractor is moving, thereby increasing traction of the wheels, and making it possible for the tractor to operate on slippery or muddy road surfaces.

Another important object of the invention is to provide means for increasing the traction qualities of the wheels of a tractor, the traction means being carried by the wheels and thrown into and out of operation, at the will of the operator, adapting the tractor for use on slippery or muddy road surfaces.

A still further object of the invention is to provide adjustable traction members, which may be moved to various positions beyond the felloe of the wheel, and held in such positions by the adjusting means.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:

Figure 1 is an elevational view of a tractor wheel constructed in accordance with the invention.

Figure 2 is an elevational view of the tread of the wheel.

Figure 3 is a vertical sectional view through the wheel, taken on line 3—3 of Figure 2.

Figure 4 is a sectional view taken on line 4—4 of Figure 3.

Figure 5 is a view of the tread of the wheel, the rubber tread blocks having been removed.

Figure 6 is a fragmental detail view illustrating the inner surface of the felloe of the wheel.

Figure 7 is a sectional view taken substantially on line 7—7 of Figure 3.

Figure 8 is a bottom view of one of the rubber block securing plates.

Figure 9 is a longitudinal sectional view therethrough.

Figure 10 is a sectional view taken on line 10—10 of Figure 7.

Figure 11 is a detail view of one of the traction spikes of the wheel.

Figure 12 is a fragmental side elevational view illustrating a modified form of the invention.

Figure 13 is an elevational view illustrating the modified form of tread as shown by Figure 12.

Referring to the drawings in detail, the reference character 5 designates the hub of a tractor wheel, the hub being mounted on the axle 6 and secured thereto, by means of bolts 7, to move therewith.

As shown, the hub is provided with a curved outer surface 8 providing a bearing for the circumferentially movable member 9, that is provided with spaced flanges 10.

Spokes indicated at 11 connect the hub 5 with the felloe 12, holding the felloe and hub in spaced relation with each other, the spokes being connected with the flanges 13, extending inwardly from the felloe.

The felloe is formed with a plurality of substantially U-shaped slots 14, which slots are shaped to receive the spikes 15, that are substantially U-shaped in cross section, the slots being slightly larger than the spikes, so that the spikes will move freely through the slots.

Each spike is formed with spaced flanges that converge towards the inner ends thereof, the flanges being positioned over the spaced flanges 10, where they are secured by means of the pivot pins 16, to the end that the spike may pivot freely with respect to the circumferentially movable member 9.

Secured to the inner surface of the felloe, is an ear 17 to which the tubular member 18 is pivotally connected, the tubular member 18 being provided with internal threads that accommodate the threaded portion 19 of the shaft 20.

The shaft 20 is supported in the bearing 21 that is carried by the arms 22, which in turn are formed with openings, through which the shaft 23 extends, the shaft 23 being provided with a gear 24 that meshes with the gear 25, carried on the inner end of the shaft 20, to the end that when the shaft 23 is rotated, as by means of the removable crank handle 26, the circumferentially movable member 9 will be moved over the hub section 5, with the result that the spikes 15 are retracted, or extended through the slots of the felloe, according to the direction of rotation of the member 9.

Coiled springs 27 are connected with the spikes, and have their inner ends anchored to the member 9, so that when the member 9 is rotated to extend the spikes, the springs 27 will be placed under tension, and when the shaft 23 is rotated to retract the spikes, the coiled springs acting on the spikes, will tend to draw the spikes to their innermost positions.

In order that rotary movement of the member 9 will be restricted to such an extent that the spikes cannot be retracted too far, a stop indicated at 28 is adjustably mounted on one of the flanges 10, the stop being so located that it will engage a spoke 11.

Thus it will be seen that due to this construction, the spikes may be moved to positions as shown by Figure 1 of the drawings, where they will lie within the confines of the felloe of the wheel, and will not damage the surface over which the wheel is moving.

Cushion members 29 are mounted in the plates 30, that in turn are bolted to the periphery of the wheel, so that when the traction spikes are in their inactive positions, the cushion members will support the weight of the wheel and tractor.

Should it be desired to increase the traction of the wheels, so that the wheels may move over slippery or muddy surfaces, the crank handle 26 is operated to move the axially movable member 9 in an anticlockwise direction, with the result that the spikes are extended through the slots 14, beyond the surfaces of the cushion members 29.

In the form of the invention as shown by Figures 12 and 13 of the drawings, in place of the cushion members 29, cleats 31 are provided, the cleats 31 being disposed diagonally across the tread surface of the wheel. Each of these cleats 31 embodies spaced flanges 32 that bite into the road surface.

Having thus described the invention, what is claimed is:

In a traction wheel, a hub section having a transversely curved outer surface, a felloe having substantially U-shaped slots, spokes connecting the hub section and felloe, a circumferentially movable member curved to conform to the curvature of the outer surface of the hub section whereby the movable member is secured in position on the hub section, spaced flanges formed on the circumferentially movable member, spikes, each spike embodying a length of sheet metal material bent to provide spaced longitudinal flanges, said flanges tapering towards the inner ends thereof, said spikes having cutaway portions accommodating the flanges of the circumferentially movable member, the flanges of the spikes resting on opposite sides of the flanges of the circumferentially movable member, coiled springs connected to the flanges of the circumferentially movable member, the outer ends of the springs being connected to the spikes and mounted within the spikes, and means to rotate the circumferentially movable member for extending or retracting the spikes.

WALTER MAXWELL.